United States Patent
Kranz et al.

(10) Patent No.: US 8,214,103 B2
(45) Date of Patent: Jul. 3, 2012

(54) METHODS AND SYSTEMS FOR MONITORING OF MOTOR VEHICLE FUEL EFFICIENCY

(75) Inventors: Mark J. Kranz, Hallsville, TX (US); Daylen Borders, Overton, TX (US)

(73) Assignee: Stemco LP, Longview, TX (US)

( * ) Notice: Subject to any disclaimer, the term of this patent is extended or adjusted under 35 U.S.C. 154(b) by 1199 days.

(21) Appl. No.: 11/872,444

(22) Filed: Oct. 15, 2007

(65) Prior Publication Data

US 2009/0099724 A1    Apr. 16, 2009

(51) Int. Cl.
  *G01M 15/04* (2006.01)
  *B06Q 10/00* (2006.01)
  *G06F 19/00* (2006.01)

(52) U.S. Cl. .... 701/32.5; 701/33.4; 701/123; 340/450.2

(58) Field of Classification Search ............ 701/35, 701/33, 2, 123, 32.5, 33.4; 340/450.2; 705/335, 705/341, 500, 4; 702/55; 455/67.11, 41.2

See application file for complete search history.

(56) References Cited

U.S. PATENT DOCUMENTS

| | | | |
|---|---|---|---|
| 3,908,451 A * | 9/1975 | Walker et al. | 73/114.53 |
| 7,379,897 B2 * | 5/2008 | Pinkus | 705/16 |
| 7,604,169 B2 * | 10/2009 | Demere | 235/384 |
| 2003/0191566 A1 * | 10/2003 | Ben-Assa | 701/29 |
| 2007/0174004 A1 * | 7/2007 | Tenzer et al. | 701/123 |
| 2008/0125958 A1 * | 5/2008 | Boss et al. | 701/123 |
| 2008/0162193 A1 * | 7/2008 | Voggenauer | 705/4 |
| 2008/0270016 A1 * | 10/2008 | Proietty et al. | 701/123 |
| 2009/0069999 A1 * | 3/2009 | Bos | 701/102 |

* cited by examiner

*Primary Examiner* — Tan Q Nguyen
(74) *Attorney, Agent, or Firm* — Holland & Hart LLP

(57) ABSTRACT

Systems and methods for monitoring of vehicle efficiency use wireless remote sensors associated with the vehicle and with a fueling station. Vehicle data is collected from the wireless sensors in conjunction with fueling of the vehicle. Efficiency is calculated, such as by calculating miles per gallon for the vehicle, and the information is stored in a computing system. Vehicle efficiency may be tracked over time to identify deviations or irregularities that may be addressed to improve overall vehicle efficiency, and overall vehicle efficiency for a fleet of vehicles that are all monitored in such a manner.

15 Claims, 9 Drawing Sheets

METHODS AND SYSTEMS FOR MONITORING OF MOTOR VEHICLE FUEL EFFICIENCY

FIELD

The present invention is related to wireless identification and monitoring of fuel and mileage sensors by a remote monitor, and more specifically, to wireless interrogation of fuel consumption and odometer sensors and the automatic determination of fuel economy.

BACKGROUND

Many private and governmental entities operate fleets of vehicles as part of their operation. For example, trucking companies, package pick-up and delivery companies, bus companies, governmental transportation agencies, and school districts, to name but a few, all typically operate fleets of vehicles. Cost savings in operating vehicles is always desirable, particularly in businesses with slim operating margins and governmental agencies that operate on limited budgets. The cost of operating a vehicle comes from many sources, including capital costs for purchasing or leasing the vehicle, wages for vehicle operators, vehicle maintenance costs, and fuel costs. Perhaps the most significant operating cost for vehicles, are wages for vehicle operators, service personnel, and fuel costs. Of these items, fuel costs are often highly variable and difficult to estimate and budget. Fuel costs are a function of the amount of fuel consumed by the vehicle and the unit cost of the fuel. If a vehicle is driven 50,000 miles in a year, even a slight improvement in fuel economy can result in significant reduction in the amount of fuel consumed by the vehicle for the year. For example, if a bus consumes, on average, one gallon of fuel per 12 miles, the bus will consume over 4,166 gallons of fuel to travel the 50,000 miles. If the fuel economy of the bus is improved slightly, resulting in the vehicle averaging 13 miles per gallon of fuel, the bus will consume slightly over 3,846 gallons of fuel to travel the 50,000 miles. Thus, this modest increase in fuel economy results in a savings of approximately 320 gallons of fuel. If an operator of a fleet of 50 vehicles can increase the overall fuel economy of the fleet by such an amount, the resulting annual fuel savings is approximately 16,000 gallons when, on average, each vehicle in the fleet travels 50,000 miles per year. With per gallon costs of fuel ever increasing, it is thus important for vehicles to maintain the best fuel efficiency as reasonably possible. In the above example, if fuel costs are $2.50 per gallon, the annual savings is $40,000, or a reduction in fuel expenses of approximately 8%. While recognizing that enhanced fuel efficiency can lead to significant cost savings, often the capital or operating expenses associated with obtaining enhanced fuel efficiency outweighs any cost savings that result from the reduced fuel consumption.

SUMMARY

Embodiments disclosed herein provide systems and methods for monitoring of vehicle efficiency using remote sensors associated with the vehicle and with a fueling station. Vehicle data is collected in conjunction with fueling of the vehicle. Efficiency is calculated, such as by calculating miles per gallon for the vehicle, and the information is stored in a computing system. Vehicle efficiency may be tracked over time to identify deviations or irregularities that may be addressed to improve overall vehicle efficiency, and overall vehicle efficiency for a fleet of vehicles that are all monitored in such a manner.

In one aspect, a method is provided for tracking fuel economy across a plurality of vehicles by a computer that is remote from the vehicles. The method of this aspect comprises the steps of: (a) receiving fuel information from a radio frequency (RF) interrogator corresponding to a quantity of fuel pumped into a first vehicle; (b) receiving a current odometer reading from the RF interrogator corresponding to a current reading for an odometer associated with the first vehicle; (c) determining a previous odometer reading received for the odometer associated with the first vehicle, the previous odometer reading corresponding to a previous fueling of the first vehicle; (d) calculating a distance traveled by the first vehicle since the previous fueling as the difference between the previous odometer reading and the current odometer reading; (e) calculating a fuel economy for the first vehicle as the ratio of the distance traveled and quantity of fuel pumped into the first vehicle; (f) recording the fuel economy and current odometer reading for the first vehicle; and (g) repeating the steps of (a) through (f) for the first vehicle and other vehicles of the plurality of vehicles.

Fuel information, in an embodiment, is received according to the steps of (a) firstly interrogating, with a RF interrogator, a wireless fluid flow meter and reading a first value corresponding to total fluid that has flowed through the meter; (b) transmitting the first value from the RF interrogator to the remote computer; (c) filling the first vehicle with fuel; (d) secondly interrogating, with the RF interrogator, the wireless fluid flow meter and reading a second value corresponding to total fluid that has flowed through the meter; (e) transmitting the second value from the RF interrogator to the remote computer; and (f) computing the quantity of fuel pumped into the first vehicle as the difference between the first and second values. The wireless fuel flow meter may include a meter that measures a quantity of fluid that is dispensed from a pump, a processing unit that is operably interconnected to the meter and receives fluid quantity information, a radio frequency (RF) transmitter operably interconnected to the processing unit and operable to transmit fluid quantity information, and a self-contained power supply that provides power to the meter, processing unit, and RF transmitter. Current odometer information, in an embodiment, is received according to the steps of (a) interrogating, with a RF interrogator, an odometer and reading a current value corresponding to total distance recorded by the odometer that the vehicle has traveled; and (b) transmitting the current value from the RF interrogator to the remote computer.

Vehicle efficiency information over time may be monitored, in an embodiment, after the step of recording, by: (h) secondly receiving fuel information from a RF interrogator corresponding to a second quantity of fuel pumped into the first vehicle; (i) setting the current odometer reading as the previous odometer reading; (j) secondly receiving a second current odometer reading from a RF interrogator corresponding to the current reading for the odometer associated with the first vehicle; (k) calculating a second distance traveled by the first vehicle since the step of (a) as the difference between the previous odometer reading and the second current odometer reading; (l) calculating a second fuel economy for the first vehicle as the ratio of the second distance traveled and second quantity of fuel pumped into the first vehicle; (m) recording the second fuel economy and current odometer reading for the first vehicle; and (n) repeating the steps of (h) through (m) for additional fueling events for the first vehicle. Vehicle and/or fleet problems or issued for investigation may be determined by tracking the fuel economy of the plurality of vehicles for a plurality of fueling events for each vehicle, computing an average fuel economy for each of the plurality of vehicles, and identifying deviations from the average fuel economy. An exception report may be generated that indicates deviations and identifies a vehicle of the plurality of vehicles as having a deviation, a user of the system being provided with the exception report.

In another aspect, the present disclosure provides an apparatus that measures and transmits pumped fluid quantity information, comprising: (a) a meter that measures a quantity of fluid that is dispensed from a pump; (b) a processing unit that is operably interconnected to the meter and receives fluid quantity information; (c) a radio frequency (RF) transmitter operably interconnected to the processing unit and operable to transmit fluid quantity information; and (d) a self-contained power supply that provides power to the meter, processing unit, and RF transmitter. The meter may comprise a flow sensor that is operably interconnected to a fueling hose of a mobile fuel station. The RF transmitter, in an embodiment, is interconnected to the processing unit through a hall effect sensor.

In a further aspect, the present disclosure provides an apparatus for tracking fuel economy across a plurality of vehicles, comprising: (a) means for receiving fuel information from a radio frequency (RF) interrogator corresponding to a quantity of fuel pumped into a first vehicle, and a current odometer reading from the RF interrogator corresponding to a current reading for an odometer associated with the first vehicle; (b) means for determining a previous odometer reading received for the odometer associated with the first vehicle, the previous odometer reading corresponding to the previous fueling of the first vehicle; (c) means for calculating a distance traveled by the first vehicle since the previous fueling as the difference between the previous odometer reading and the current odometer reading; (d) means for calculating a fuel economy for the first vehicle as the ratio of the distance traveled and quantity of fuel pumped into the first vehicle; and (e) means for recording the fuel economy and current odometer reading for the first vehicle. The means for receiving fuel information may comprise an RF interrogator operable to interrogate a wireless fluid flow meter and read a value corresponding to fluid that has flowed through the meter, and an RF receiver that receives information from the RF interrogator. The apparatus of this aspect may also comprise means for tracking the fuel economy of the plurality of vehicles for a plurality of fueling events for each vehicle; means for computing an average fuel economy for each of the plurality of vehicles; and means for identifying deviations from the average fuel economy.

DETAILED DESCRIPTION

Figure 1:
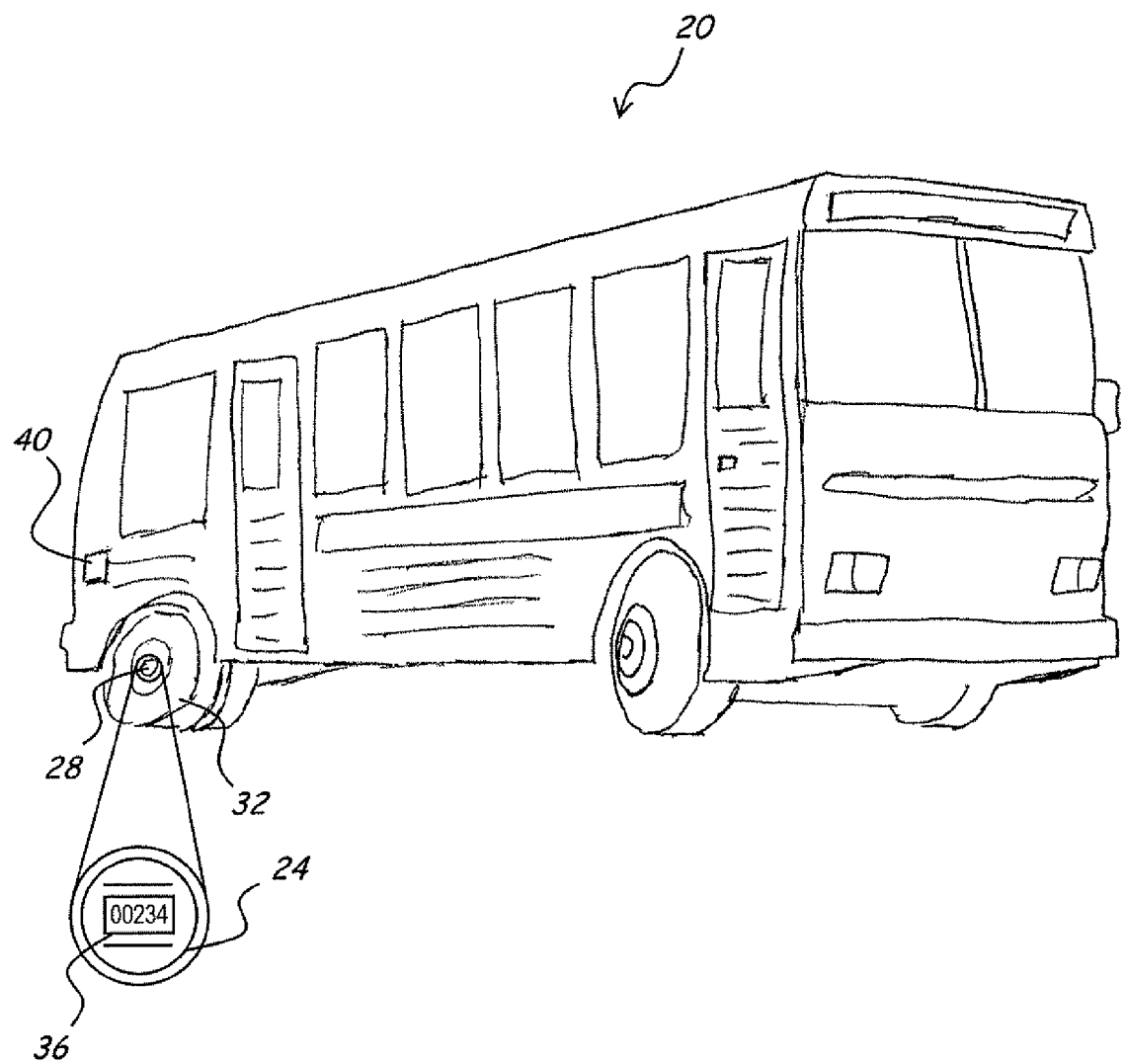
FIG. 1 is a perspective view of a vehicle of one embodiment.

For a more complete understanding of this invention, reference is now made to the following detailed description of several embodiments as illustrated in the drawing figures, in which like numbers represent the same or similar elements. Various embodiments are described herein, with specific examples provided in many instances to serve to illustrate and discuss various concepts included in the present disclosure. The specific embodiments and examples provided are not necessarily to be construed as preferred or advantageous over other embodiments and/or examples.

As discussed above, fuel costs are a significant and variable portion of the overall operating costs for a fleet of vehicles. While it is recognized that increasing fuel efficiency can lead to significant cost savings, often entities do not have any detailed records of how a particular vehicle is performing with respect to fuel economy, or records that may exist are often unreliable and/or incomplete. The present disclosure recognizes that when evaluating the fuel efficiency and attempting to improve fuel efficiency, an accurate status of how each particular vehicle in a fleet is performing would be a useful tool. Furthermore, tracking of a vehicle's performance over time would also be a useful tool, in order to identify and correct any deviations from the historical fuel efficiency for that particular vehicle. Many current methods for data tracking involve manual entry of information using paper logs carried by maintenance personnel, with information written onto the log that is later entered into a computing system to determine relevant fuel efficiency and other information. Such methods consume significant time and resources, requiring field personnel to manually read and enter information, and either enter information into a computing system or delivering the log to another person to enter the information. Such personnel intensive systems often have a time cost that may offset any gains relating to recording this information. Such systems may also have increased potential for errors to be introduced into the data, as numbers may be written incorrectly and/or digits transposed, to name but two examples. Furthermore, paper sheets that are carried by such personnel are often soiled with dirt and/or grease that renders the information on the form unreadable. Various embodiments of the present disclosure provide methods, systems, and apparatuses that enable accurate collection and monitoring of vehicle fuel economy that may be used to asses vehicle and/or operator performance and make changes to increase fuel economy on a vehicle-by-vehicle basis to thereby reduce operating costs for the vehicle and any fleet to which the vehicle belongs. As used herein, fuel economy, fuel efficiency, and fuel mileage are used interchangeably to refer to the distance a vehicle travels per unit of fuel.

With reference to FIG. 1, a vehicle 20 is illustrated for one embodiment as a bus that may be used in public transit. While the vehicle 20 of FIG. 1 is illustrated as a public transit bus, it will be readily understood that this example is for purposes of illustration and discussion, and that methods, systems and apparatuses of the present disclosure may be used for any type of vehicle, including, for example, automobiles, trucks, semi tractor/trailers, and school buses. Furthermore, the systems and apparatuses of the present disclosure may also be used with other types of vehicles, including rail vehicles, aircraft, and/or watercraft. In the embodiment of FIG. 1, an odometer 24 is mounted to a wheel hub 28 of a set of rear wheel 32. Typically wheel 32 includes a set of dual wheels, although the present disclosure is equally applicable to any wheel configuration. Such an odometer 24 is often referred to as a "hubodometer," and these devices are commonly used in situations where the mileage of the wheel 32 may not necessarily be tracked by an odometer within the vehicle 20 itself, and/or in situations where it is convenient to view a mileage reading without having to access an interior of the vehicle 20. For example, in the example of buses used in public transit, it may be more efficient for maintenance personnel to view the mileage of a bus on such a hubodometer 24 rather than having to open a door to the bus, climb into the bus, read a mileage from an odometer on the interior instrument panel, exit the bus, and close the door. Furthermore, in many cases digital odometers on the instrument panel may not be active unless the vehicle is turned on, thus making such checking of mileage even more inefficient. The odometer 24 of the embodiment of FIG. 1 includes a display 36 that displays the distance traveled, such as total miles since the odometer's 24 installation, of the vehicle 20. Such an odometer 24 may record and display the distance traveled since a particular event, such as vehicle 20 maintenance or wheel 32 replacement, instead of or in addition to the total distance recorded since the installation of the odometer. In the embodiment of FIG. 1, the odometer 24 is an electronic hubodometer that measures distance traveled according to a number of revolutions detected by an accelerometer within the hubodometer and a size of the wheel 32 that is programmed into the hubodometer. The odometer 24 also includes an RF circuit that operates to transmit an information signal modulated onto an RF signal that includes an identification for the odometer 24 and the current value of the distance that has been measured by the odometer 24. The vehicle 20 has a fuel filling port 40, as is typical of gasoline or diesel powered vehicles, where a pump nozzle may be inserted and fuel pumped into a fuel tank of the vehicle 20. As is well known, fuel economy of the vehicle 20 is calculated as the distance traveled by the vehicle 20 divided by the quantity of fuel the vehicle 20 consumed in order to travel that distance, such as miles traveled per gallon of consumed fuel or simply "miles per gallon (mpg)."

Figure 2:
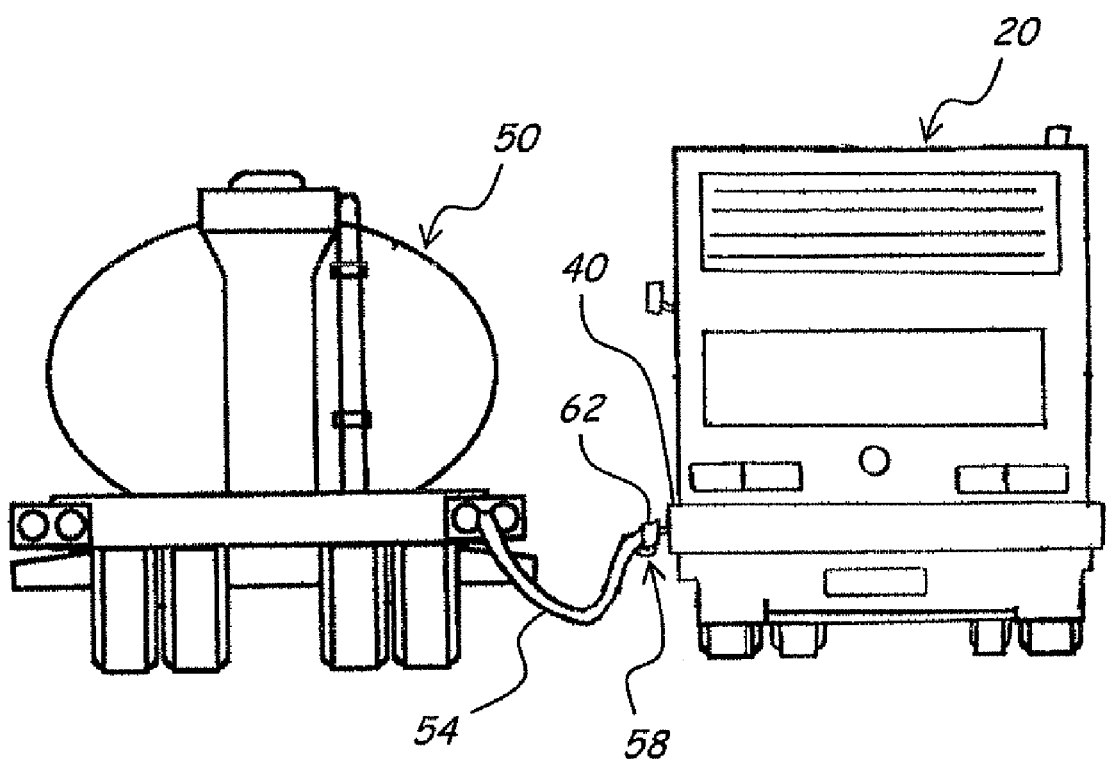
FIG. 2 is an elevation view of a fuel truck and vehicle of an embodiment.

With reference now to FIG. 2, an elevation view of a fuel truck 50 and vehicle 20 of an embodiment is now described. In this embodiment, fuel truck 50 pumps fuel into vehicle 20, through a hose 54 and nozzle 58. Such a configuration is well known, and commonly in use in many different operations. Such fuel trucks 50 may or may not have fuel meters that measure a quantity of fuel that has been pumped from the fuel truck 50. In this embodiment, the fuel truck 50 includes a fluid flow meter 62 on the nozzle 58 that provides capability for wireless transmission of meter information. While illustrated on the nozzle, fluid flow meter 62 may be located anywhere in the fluid flow path from fuel truck 50 to vehicle 20. The fluid flow meter 62 will be described in more detail below with reference to FIG. 4.

Continuing with the embodiment of FIG. 2, the vehicle 20 includes wheel(s) 32 with an odometer 24 on wheel hub 28, as previously discussed. The fluid flow meter 62, similar to odometer 24 as described above, includes an RF circuit that operates to transmit an information signal modulated onto an RF signal. The information signal includes an identification for the fluid flow meter 62 and the current volume of the fluid that has been pumped through the fluid flow meter 62. In an embodiment, an operator uses a handheld interrogator to interrogate both the fluid flow meter 62 and the odometer 24 to obtain the current values of the fluid flow meter 62 and the odometer 24 prior to dispensing fuel. The operator then pumps fuel into the vehicle 20, and upon completion interrogates the fluid flow meter 62 again. The interrogator may communicate the received information to a central location via an RF link, or to a local computer via a wired data communications link. The interrogator will be described in additional detail below with reference to FIG. 5.

Figure 3:
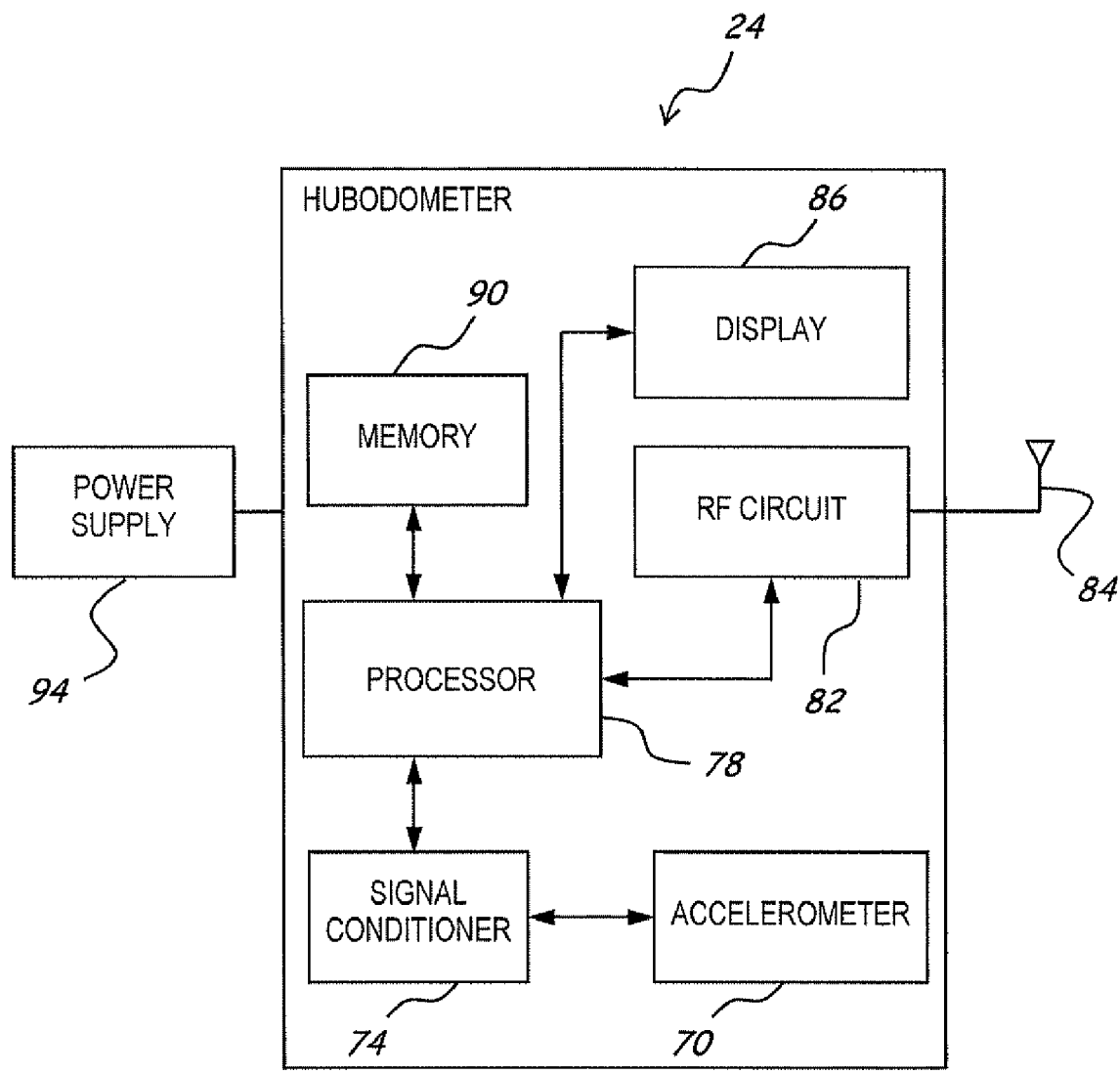
FIG. 3 is a block diagram illustration of a hubodometer of an embodiment.

With reference now to FIG. 3, an odometer 24 is described in additional detail for an embodiment. The odometer 24, in this embodiment, is an electronic hubodometer. The hubodometer includes an accelerometer 70 that measures acceleration with a two-axis accelerometer. The signal for each of the accelerometer 70 axes is received by a signal conditioner 74 that smoothes and processes the signals to provide an output indicative of the number of revolutions of the wheel to which the odometer 24 is mounted. The output from the signal conditioner 74 is received at a processor 78, that determines a distance based on the wheel size and number of revolutions output by the signal conditioner 74. The processor 78 is interconnected to an RF circuit 82 that is interconnected with antenna 84. The RF circuit 82, in various embodiments, may receive an interrogation signal through antenna 84 and provide information to the processor 78 that then prompts the RF circuit 82 to transmit a response signal through the antenna 84. In various other embodiments, the RF circuit 82 periodically transmits RF signals through antenna 84 that include information related to the sensor. The RF circuit 82 is a circuit that is typical of RF identification (RFID) systems, and may be an active circuit, passive circuit, or semi-active circuit. Antenna 84 may include a single antenna that is used for both transmitting and receiving RF signals, or may include more than one antenna such as separate transmit and receive antennas. The processor 78 also is interconnected to a display 86 that outputs the current value of the distance measured by the processor 78. In one embodiment, the display 86 is a digital display that outputs a digital number that corresponds to the current mileage of the odometer 24. The current mileage may be displayed when the vehicle is stopped, or in response to an input from an operator to view the mileage of the odometer 24. In embodiments where mileage is displayed only in response to an operator input, power may be conserved by only outputting the mileage on the display 86 when prompted. The processor 78, in this embodiment, is also interconnected with a memory 90, that may include a volatile memory, non-volatile memory, or combination thereof. The memory 90 includes an identification that is unique to the odometer 24, which in an embodiment is a 32 bit identification that is transmitted by the RF circuit 82 in response to an interrogation. The memory 90 also includes programming information that provides information related to the wheel size that the processor 78 then uses to determine a distance measured by the odometer 24. Finally, a power supply 94 provides power to the hubodometer 24. The power supply 94 may include one or more batteries that, in some embodiments, may be replaced or recharged.

Figure 4:
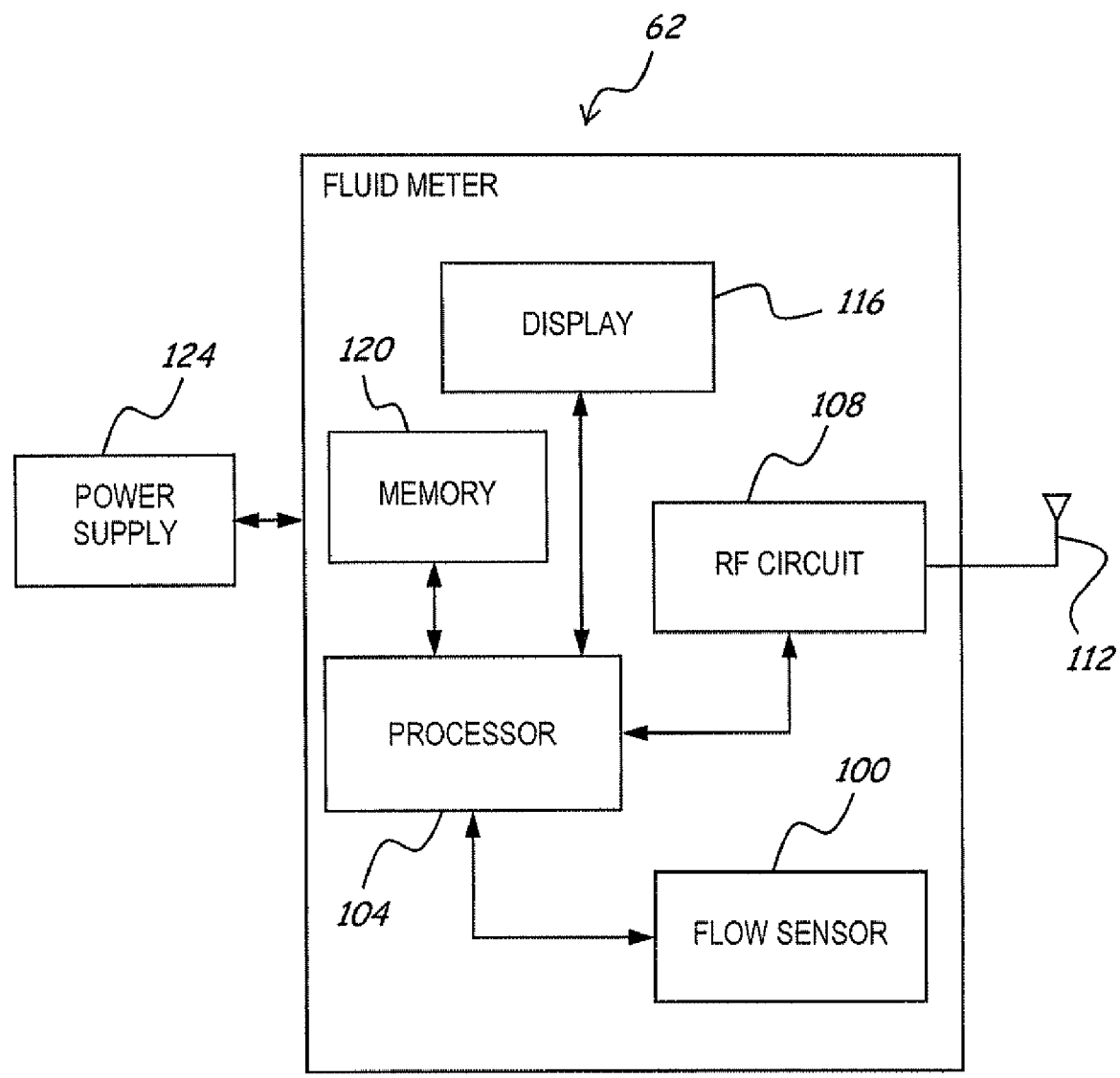
FIG. 4 is a block diagram illustration of a fluid meter of an embodiment.

With reference now to FIG. 4, a block diagram illustration of a fluid flow meter 62 is described. In this embodiment, the fluid flow meter 62 includes a flow sensor 100 that senses fluid that flows through an adjoined tube or hose. The flow sensor 100 is interconnected to a processor 104, that receives input from the flow sensor 100. In one embodiment, the processor is interconnected to the flow sensor 100 by a hall effect sensor that provides an indication of a volume of fluid that has moved through the adjoined tube or hose. For example, the flow sensor 100 may include a turbine type flow meter manufactured by Great Plains Industries Inc. of Wichita, Kans., and described in U.S. Pat. No. 4,856,348 entitled "Flow Meter Turbine," and issued on Aug. 15, 1989, and/or U.S. Pat. No. 5,046,370 entitled "Flow Meter With Improved Turbine Blades," and issued on Sep. 10, 1991, the entire disclosures of which are incorporated by reference herein. Such a turbine type flow meter includes a ferrous slug, and in an embodiment the flow sensor 100 generates a static magnetic field, and the disturbances in the magnetic field generated by the ferrous slug are monitored to determine fluid volume. The processor 104 is interconnected with a RF circuit 108 that is interconnected with antenna 112. The RF circuit 108, in an embodiment, receives an interrogation signal through antenna 112 and provides information to the processor 104, that then prompts the RF circuit 108 to transmit a response signal through the antenna 112. The RF circuit 108 is a circuit that is typical of RFID systems, and may be an active circuit, passive circuit, or semi-active circuit. Antenna 112 may include a single antenna that is used for both transmitting and receiving RF signals, or may include more than one antenna such as separate transmit and receive antennas. The processor 104 is also interconnected to a display 116 that outputs the current value of the amount of fluid measured by the flow sensor 100. In one embodiment, the display 116 is a digital display that outputs a digital number that corresponds to the current number of gallons of fuel that have been pumped by the fuel truck and measured by the flow sensor 100. The display 116 may also include an input that an operator may use to indicate a desire to view the amount of fuel pumped, and in response thereto, output the current value of the amount of flow measured by the flow sensor 100. The processor 104, in this embodiment, is also interconnected with a memory 120, that may include a volatile memory, non-volatile memory, or combination thereof. The memory 120 includes an identification that is unique to the fluid meter 62, which in an embodiment is a 32 bit identification that is transmitted by the RF circuit 108 in response to an interrogation. Finally, a power supply 124 provides power to the fluid meter 62. The power supply 124 may include one or more batteries that, in some embodiments, may be replaced or recharged, or may be interconnected with a power supply on the fuel truck. While the embodiment of FIG. 4 describes a flow sensor 100 that is interconnected with a hose or tube on a fuel truck, it will be readily understood by one of skill in the art that fluid volume may be measured using any of a number of different techniques, including tank volume changes, level sensors, and other types of flow meters, to name a few. Furthermore, while described as being associated with a fueling truck, any fluid volume measurement instrument may be associated with any type of fluid dispenser, including both mobile and fixed location fuel dispensers. A processor and RF circuit associated with the fluid dispenser provides wireless information related to fluid volume when interconnected to any such system.

Figure 5:
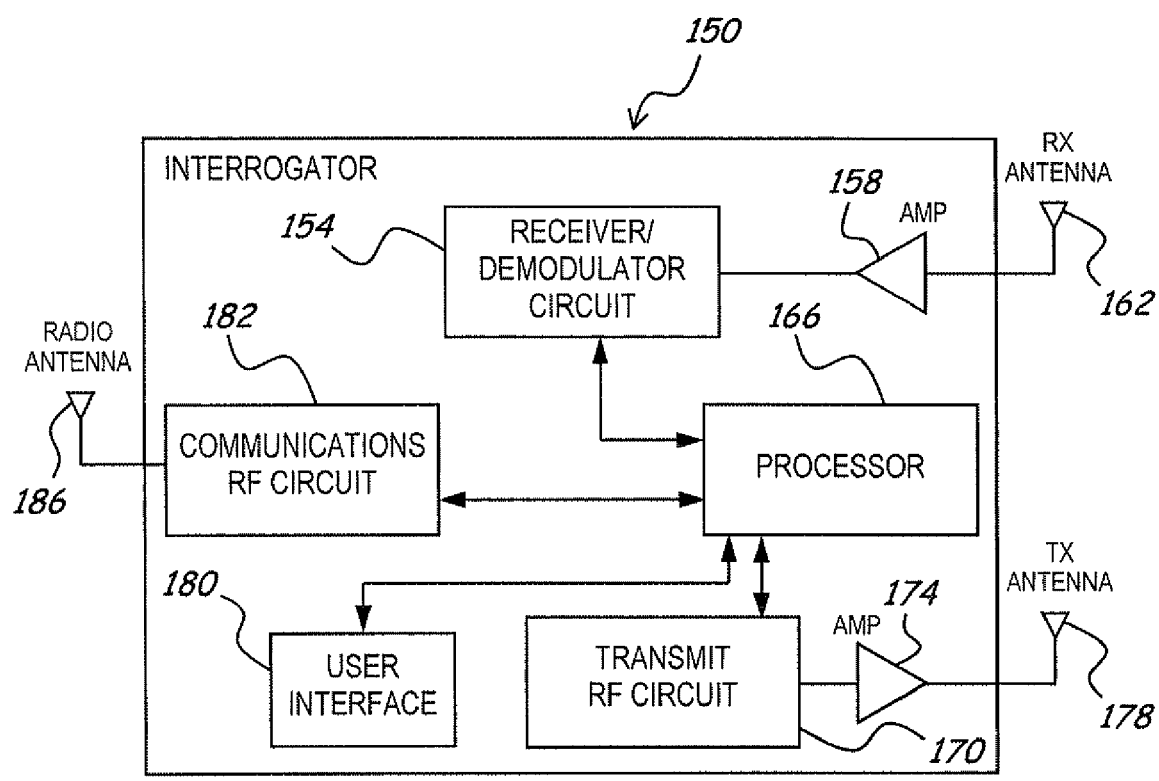
FIG. 5 is a block diagram illustration of an interrogator of an embodiment.

With reference now to FIG. 5, a functional block diagram of an interrogator 150 of an embodiment is now described. In this embodiment, the interrogator 150 is used to interrogate both fluid meters and hubodometers, obtain information from each, and report this information to another computer. The interrogator 150 includes a receiver/demodulator circuit 154 that receives RF signals from an interrogated RFID tag through amplifier 158 and receive antenna 162. The received signal is demodulated and provided to a processor 166. The received signal from the RFID tag is sent by the RFID tag in response to an interrogation signal that is generated by a transmit RF circuit 170 within the interrogator 150. The transmit RF circuit 170 transmits the interrogation signal through amplifier 170 and transmit antenna 178. In this embodiment, a user interface 180 is interconnected with processor 166, and receives an input from a user that an RFID tag is to be interrogated. For example, the interrogator may be a handheld interrogator that a user carries while fueling vehicles. The handheld interrogator is placed in relatively close proximity to the RFID tag, namely the hubodometer or flow sensor, that is to be interrogated, and depresses an interrogation button. In response to this action, the interrogator 150 generates the interrogation signal and monitors for a response signal from an RFID tag at the receiver/demodulator circuit 154. While described as a handheld unit, the interrogator 150 in various embodiments may be mounted on a fuel truck, or otherwise located in a permanent or semi-permanent location to be in a position to interrogate the necessary RFID tags during fueling operations. In some embodiments, an interrogator 150 may be positioned such that more than one RFID tag may be read in response to an interrogation. In such instances, the interrogator 150 may observe the signal strength associated with each RFID tag, and select the tag with the strongest signal strength as having the closest proximity to the interrogator and therefore the tag of interest. In other embodiments, the interrogator 150 may include directional antennas that transmit and receive RF signals only from limited directions, and may also have a limited transmit and receive range selected such that a tag that is not of interest is unlikely to be read. The interrogator 150 in this embodiment also includes a communications RF circuit 182 that is interconnected to the processor 166, and that communicates through a radio antenna 186 with a system that is located remotely from the interrogator 150. The communications RF circuit 182 may communicate using relatively short range two-way radio communications, using cellular communications, or using other communications methods. In one embodiment, the communications RF circuit 182 operates using a 2.4 GHz DSSS radio that broadcasts on regular intervals allowing for fully bidirectional communications capability with a remote radio. The interrogator 150 also includes a memory and power supply, not specifically illustrated, but that provide storage for data and/or programming instructions, and a power source, respectively, for the interrogator 150 components.

Figure 6:
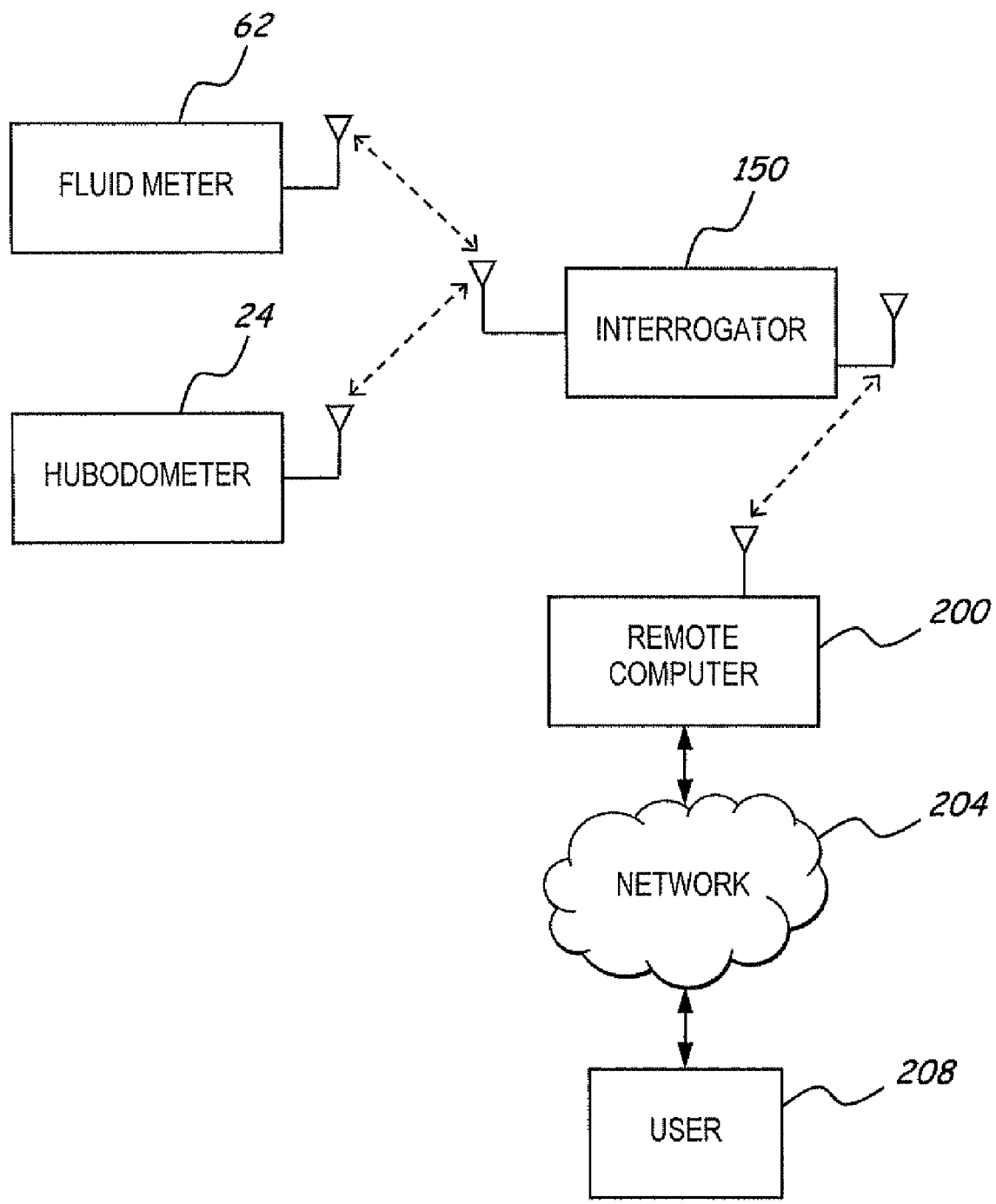
FIG. 6 is a block diagram illustration of a system that monitors fuel economy of an embodiment.

Referring now to FIG. 6, a functional block diagram of a system of an embodiment is now described. In this embodiment, a hubodometer 24 and a fluid meter 62 include RFID tags that are interrogated by interrogator 150. The interrogator 150 communicates through radio communications with a remote computer 200. As discussed above, the interrogator 150 and remote computer 200 may communicate using a 2.4 GHz DSSS radio that broadcasts on regular intervals allowing for fully bidirectional communications capability between the components. The remote computer 200 may include a database in which the identification for each hubodometer 24 is associated with an identification of the vehicle to which the hubodometer 24 is mounted. Similarly, the identification of the fluid meter 62 is associated in the database with the particular fuel truck to which the fluid meter 62 is mounted. The remote computer 200 can then associate how much fuel was added from which truck to which vehicle after the vehicle traveled the measured distance. The remote computer 200 is interconnected with a network 204, such as the Internet, and may be accessed over the network 204 by a user 208. The user 208 may, in an embodiment, access the remote computer 200 over a web based interface, such that the user 208 can view the fuel usage and mileage information for individual vehicles, and/or all of the vehicles in aggregate, from virtually any location and virtually any time through passwords and user id's. While the remote computer 200 is illustrated as a single system, data may be stored in a database separate from the remote computer 200, that may also be accessed through network 204. The user 208 may then access the database to view stored data. In such a manner, multiple remote computers 200 may store information in a database. For example, if a transmit authority has multiple garages where buses may be fueled, a remote computer 200 at each location may provide fuel and mileage data to the database, which may then be accessed to evaluate fuel and mileage characteristics for particular vehicles and/or multiple vehicles.

Figure 7:
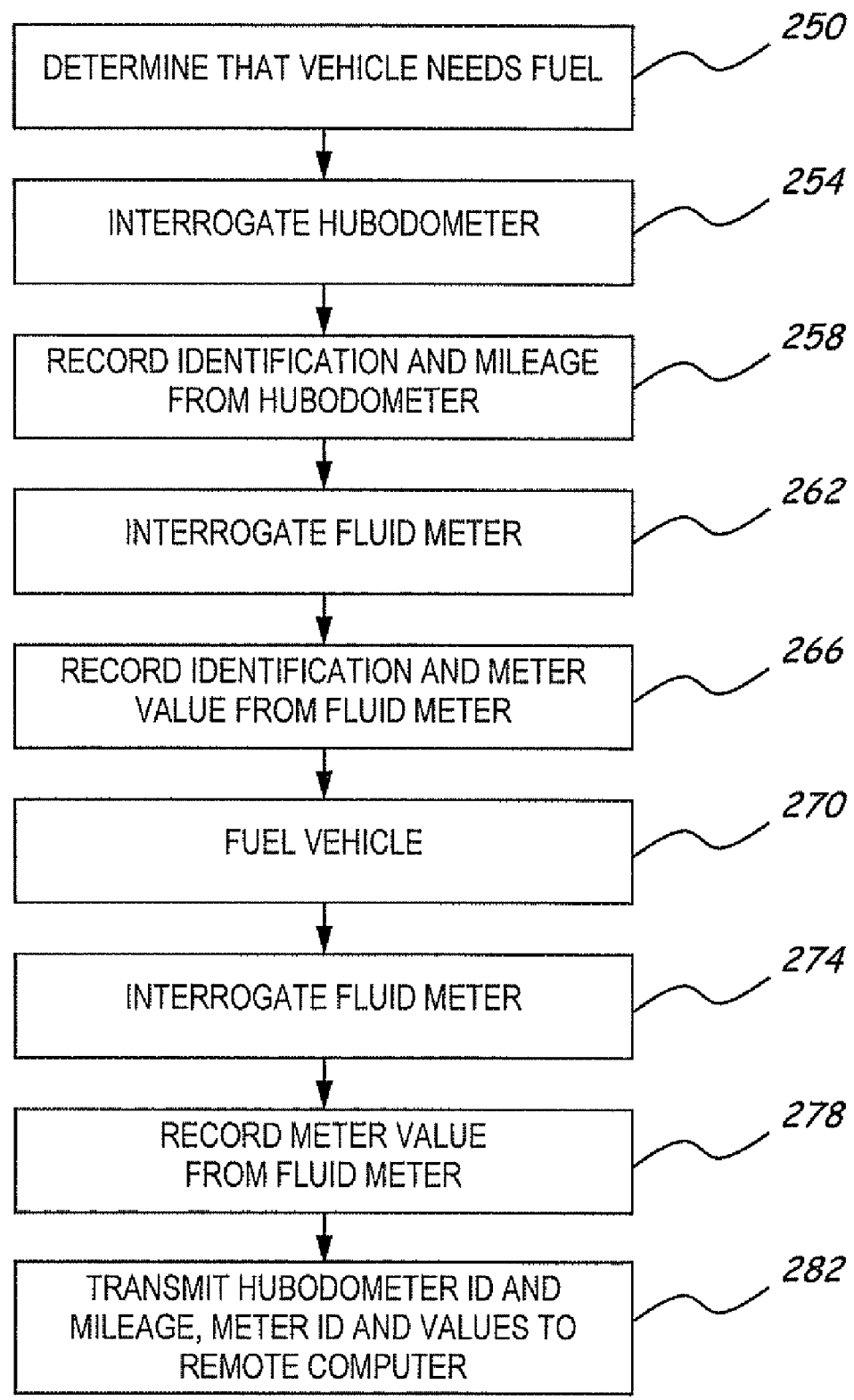
FIG. 7 is a flow chart diagram illustrating the operational steps for obtaining mileage and fuel quantity information for an embodiment.

Referring now to FIG. 7, the operational steps for obtaining mileage and fuel quantity information are described for an embodiment. In this embodiment, it is first determined, according to block 250, that a vehicle needs fuel. Such a determination may be made in any of a number of ways, such as by observing a current quantity of fuel in the vehicle, or by a vehicle operator noting that the vehicle needs fuel, to name but two examples. In other cases, each vehicle may simply be refueled at a preset interval, such as daily. The hubodometer is interrogated, as indicated at block 254. As discussed above, the hubodometer may be interrogated using a handheld interrogator that a user holds within a close proximity to the hubodometer, presses a read button, and interrogates the hubodometer. The identification and mileage information from the hubodometer is recorded at block 258. This information, in this embodiment, is recorded in a memory of the interrogator for later communication to a remote computer. However, in other embodiments, the interrogator may transmit the mileage and identification information upon receipt from the hubodometer. At block 262, the fluid meter is interrogated. Similarly as discussed above, a user may hold a handheld interrogator within a close proximity to the fluid meter and depress a read button, causing the interrogator to interrogate the fluid meter. The interrogator records the meter identification and the current value of the fluid meter according to block 266. Similarly as discussed above, this information is also recorded in the memory of the interrogator for later communication to the remote computer. However, in other embodiments, the interrogator may transmit the identification and meter value information upon receipt from the fluid meter. In one embodiment, the fluid meter maintains a value that corresponds to the total amount of fluid that has passed through the associated hose or tube, and reports this cumulative number when interrogated. At block 270 the vehicle is fueled. When the vehicle is fueled, fuel is added to a fuel tank, or tanks, on the vehicle until the tank(s) is/are full. When fueling is complete, the fluid meter is interrogated again, as noted at block 274. At block 278, the interrogator records the meter identification and current value of the fluid meter, and stores this information in memory. At block 282, the interrogator transmits the hubodometer identification and mileage information, and the meter identification and both meter values, to the remote computer. In such a manner, the quantity of fuel added to the vehicle, as well as the current vehicle mileage, is recorded and transmitted to the remote computer.

Figure 8:
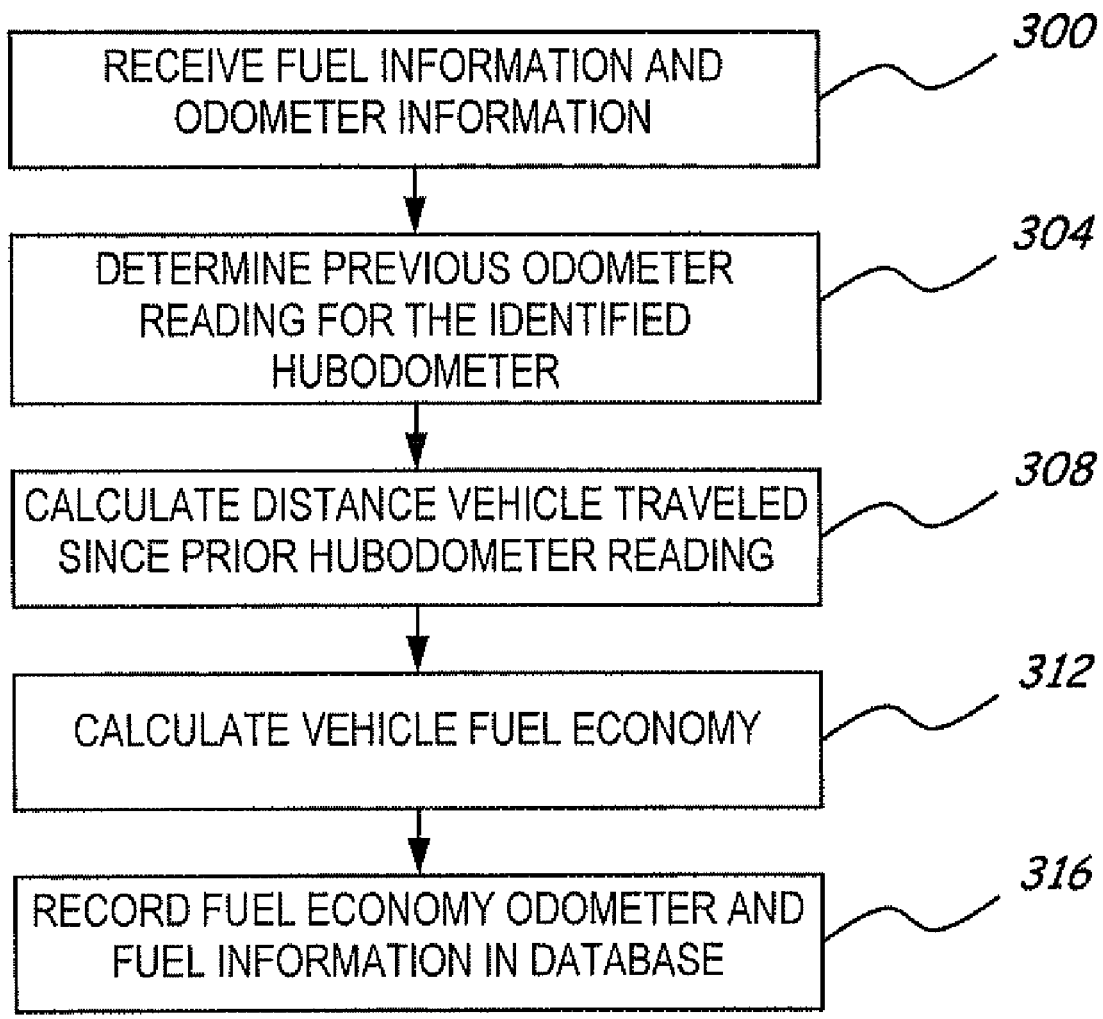
FIG. 8 is a flow chart diagram illustrating the operational steps for determining fuel economy for an embodiment.

With reference now to FIG. 8, the operational steps for determining vehicle fuel economy are described for an embodiment. The operational steps may be performed on a computer that is remote to other system components, or at a database that is interconnected to one or more computers that receive mileage and fuel quantity information. Initially, at block 300, fuel information and odometer information is received. As described above, this information may be received at a remote computer from an interrogator that has interrogated both the fuel meter and hubodometer to determine this information. At block 304, the previous odometer reading for the vehicle is determined. This determination is made by identifying the identification of the interrogated hubodometer, matching the identification with a vehicle to which the hubodometer is mounted, and determining the previous hubodometer reading for that vehicle. At block 308, a distance is calculated as a difference between these two readings that is the distance since the vehicle was last fueled. At block 312, the vehicle fuel economy is calculated based on the distance traveled and the quantity of fuel added to the vehicle. The fuel economy, odometer reading, and quantity of fuel information is stored in a database, according to block 316. As discussed above, this database may be accessed to monitor fuel economy and identify any trends or deviations in fuel economy for a particular vehicle.

Figure 9:
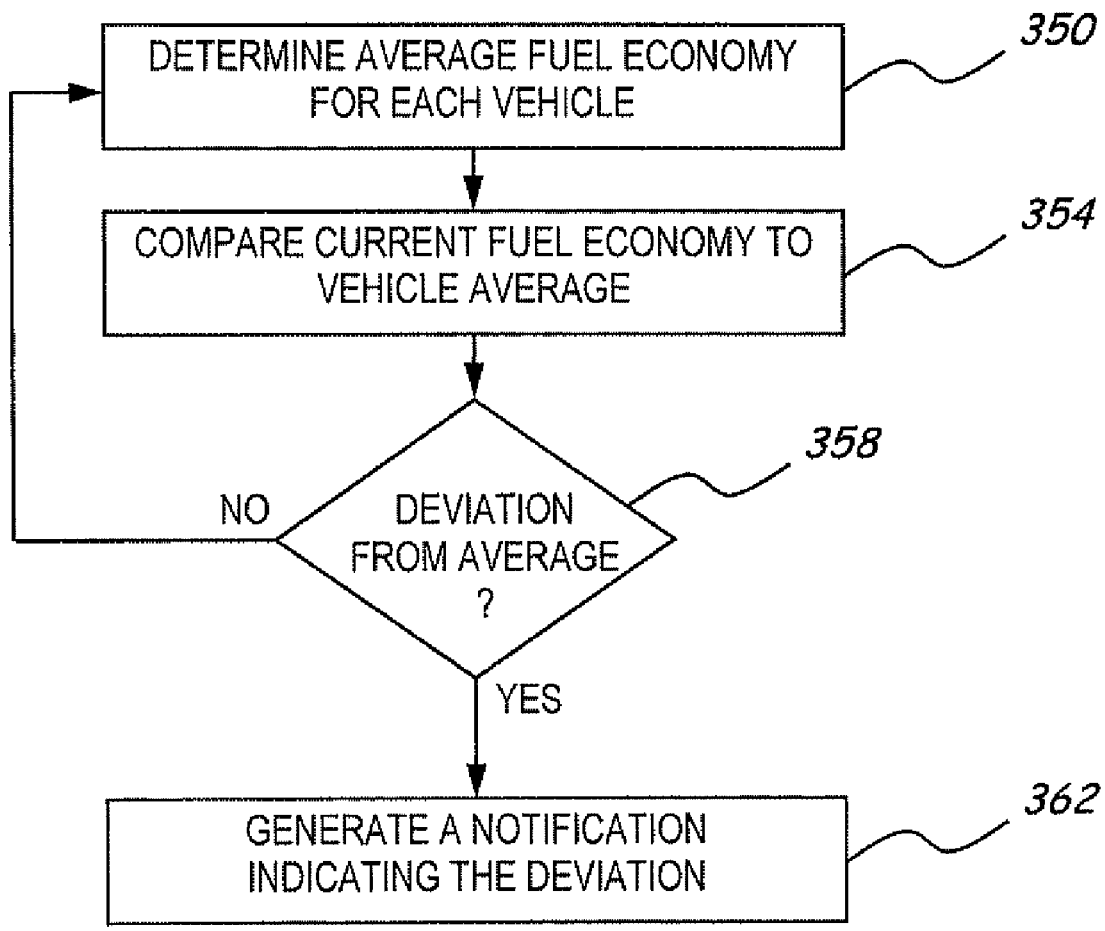
FIG. 9 is a flow chart diagram illustrating the operational steps for determining that a vehicle has had a deviation in fuel economy.

With reference now to FIG. 9, the operational steps for identifying a potential problem are described for an embodiment. In this embodiment, the average fuel economy for each vehicle is determined, as indicated at block 350. The average fuel economy may be determined by determining the mean of all recorded fuel economies, or by determining the total vehicle distance traveled for a predetermined time, and the total amount of fuel consumed by the vehicle, and calculating the fuel economy. Numerous other methods may be used to determine an average fuel economy, including filtering of outlier data, incorporating correction factors to account for different fuel blends, and calculating moving averages over a predetermined number of fuel additions, to name but a few. At block 354, the most recent, or current, fuel economy for the vehicle is compared to the average fuel economy for the vehicle, and at block 358 it is determined if the current fuel economy deviates from the average. If there is no deviation, the operations of block 350 are repeated. If a deviation is detected, a notification is generated indicating the deviation, as indicated at block 362. A deviation may be detected if any of a number of events is detected, such as, for example, a fuel economy that deviates by greater than a certain percentage from the average fuel economy. The notification that a vehicle had deviated from average fuel economy may be sent to a user, such as a fleet maintenance manager, who may then investigate the issue and take corrective action. For example, a notification may be sent that a particular vehicle had reduced fuel economy for the previous tank of fuel the vehicle consumed. The vehicle may be inspected, and a source of the reduced efficiency determined, such as one or more underinflated tires for example. The problem may be corrected, and the vehicle may be monitored to verify that fuel economy returns to an expected level. In one embodiment, the information related to the time period of reduced fuel economy may be marked, and this information excluded when calculating the average fuel economy for the vehicle for future determinations of deviations from the average. As will be readily understood by one of skill in the art, numerous different sources may affect fuel economy, such as tire pressure as mentioned, engine performance, malfunctioning components within the engine or drive train, and ineffective lubricant or bearings in wheel hubs, to name but a few. In addition, the load that a vehicle carries, and/or operating conditions for the vehicle may have significant impact on fuel economy. In one embodiment, load information is entered into the database from another source, and is taken into consideration when determining if the vehicle had a deviation in fuel economy. For example, a transit agency that monitors a fleet of buses may also collect data for each vehicle related to the number of passengers riding on the bus for the particular time period, and factor this into an average fuel economy calculation. Similarly, if a transit agency switches a particular bus from a route with relatively few stops, such as an express route, to a route with more stops, such as a local route, this information may be recorded in the database and factored into a fuel economy calculation or determination of a deviation in fuel economy. Additionally, vehicle operators may have a significant impact of vehicle fuel economy based on how they operate the vehicle. For example, if an operator consistently shifts vehicle gears at an inefficient shift point, fuel economy may be adversely affected. In one embodiment, the database also includes information related to an operator identification, and fuel economy on an operator level may be determined to identify any particular vehicle operators that may not be operating vehicles in an efficient manner.

While the above disclosure describes various embodiments with respect to vehicles and fuel economy, it will be understood that other parameters may be included in a database and monitored as well, such as distance traveled by the vehicle with respect to various scheduled maintenance intervals. Furthermore, the methods, systems, and apparatuses may also be used in marine and aviation applications where performance of a particular watercraft or aircraft, or fleet thereof, is desired to be monitored. In such embodiments, the amount of fuel is collected, along with an operating parameter of the craft, such as hours of operation.

Those of skill in the art will readily understand that information and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof. Those of skill will further appreciate that the various illustrative logical blocks, modules, circuits, and operational steps described in connection with the embodiments disclosed herein may be implemented as electronic hardware, computer software, firmware, or combinations thereof. To clearly illustrate this interchangeability, various illustrative components, blocks, modules, circuits, and steps have been described above generally in terms of their functionality. Whether such functionality is implemented as hardware, software, and/or firmware depends upon the particular application and design constraints imposed on the overall system. Skilled artisans may implement the described functionality in varying ways for each particular application, but such implementation decisions should not be interpreted as causing a departure from the scope of the present invention. Furthermore, the various operational steps as described above are illustrative of some embodiments, and described operations may be performed in sequences other than those described, and various operations may be combined with other operations, or divided into separate operations.

For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for tracking fuel economy across a plurality of vehicles in a fleet of vehicles by a computer that is remote from the vehicles, comprising the steps of:
   (a) receiving fuel information from a radio frequency (RF) interrogator corresponding to a quantity of fuel pumped into a first vehicle;
   (b) receiving a current odometer reading from the RF interrogator corresponding to a current reading for an odometer associated with the first vehicle;
   (c) determining a previous odometer reading received for the odometer associated with the first vehicle, the previous odometer reading corresponding to a previous fueling of the first vehicle;
   (d) calculating a distance traveled by the first vehicle since the previous fueling as the difference between the previous odometer reading and the current odometer reading;
   (e) calculating a fuel economy for the first vehicle as the ratio of the distance traveled and quantity of fuel pumped into the first vehicle;
   (f) recording the fuel economy and current odometer reading for the first vehicle; and
   (g) repeating the steps of (a) through (f) for the first vehicle and a plurality of other vehicles of the fleet of vehicles.

2. The method, as claimed in claim 1, wherein the step of receiving fuel information comprises:

firstly interrogating, with a RF interrogator, a wireless fluid flow meter and reading a first value corresponding to total fluid that has flowed through the meter;

transmitting the first value from the RF interrogator to the remote computer;

filling the first vehicle with fuel;

secondly interrogating, with the RF interrogator, the wireless fluid flow meter and reading a second value corresponding to total fluid that has flowed through the meter;

transmitting the second value from the RF interrogator to the remote computer; and computing the quantity of fuel pumped into the first vehicle as the difference between the first and second values.

3. The method, as claimed in claim 2, wherein the wireless fuel flow meter comprises:

a meter that measures a quantity of fluid that is dispensed from a pump;

a processing unit that is operably interconnected to the meter and receives fluid quantity information;

a radio frequency (RF) transmitter operably interconnected to the processing unit and operable to transmit fluid quantity information; and a self-contained power supply that provides power to the meter, processing unit, and RF transmitter.

4. The method, as claimed in claim 1, wherein the step of receiving a current odometer reading comprises:

interrogating, with a RF interrogator, an odometer and reading a current value corresponding to total distance recorded by the odometer that the vehicle has traveled; and transmitting the current value from the RF interrogator to the remote computer.

5. The method, as claimed in claim 1, further comprising, after the step of recording:

(h) secondly receiving fuel information from a RF interrogator corresponding to a second quantity of fuel pumped into the first vehicle;

(i) setting the current odometer reading as the previous odometer reading;

(j) secondly receiving a second current odometer reading from a RF interrogator corresponding to the current reading for the odometer associated with the first vehicle;

(k) calculating a second distance traveled by the first vehicle since the step of (a) as the difference between the previous odometer reading and the second current odometer reading;

(l) calculating a second fuel economy for the first vehicle as the ratio of the second distance traveled and second quantity of fuel pumped into the first vehicle;

(m) recording the second fuel economy and current odometer reading for the first vehicle; and (n) repeating the steps of (h) through (m) for additional fueling events for the first vehicle.

6. The method, as claimed in claim 1, further comprising:

tracking the fuel economy of the plurality of vehicles for a plurality of fueling events for each vehicle;

computing an average fuel economy for each of the plurality of vehicles; and identifying deviations from the average fuel economy.

7. The method, as claimed in claim 6, further comprising:

determining a probable source of the fuel economy deviation.

8. The method, as claimed in claim 7, wherein the probable source is selected from a group consisting of: improper tire inflation; mechanical malfunction; and operator behavior.

9. The method, as claimed in claim 6, further comprising:

generating an exception report indicating deviations and identifying a vehicle of the plurality of vehicles as having a deviation; and transmitting the exception report to a user of the remote computer.

10. The method, as claimed in claim 9, wherein the user of the remote computer receives the exception report, and may access the remote computer, via a wide area network.

11. An apparatus for tracking fuel economy across a plurality of vehicles in a fleet of vehicles, comprising:

means for receiving fuel information from a radio frequency (RF) interrogator corresponding to a quantity of fuel pumped into each of the plurality of vehicles, and a current odometer reading from the RF interrogator corresponding to a current reading for an odometer associated with each of the plurality of vehicles;

means for determining a previous odometer reading received for the odometer associated with each of the plurality of vehicles, the previous odometer reading corresponding to the previous fueling of each of the plurality of vehicles;

means for calculating a distance traveled by each of the plurality of vehicles since the previous fueling as the difference between the previous odometer reading and the current odometer reading;

means for calculating a fuel economy for each of the plurality of vehicles as the ratio of the distance traveled and quantity of fuel pumped into the first vehicle; and means for recording the fuel economy and current odometer reading for each of the plurality of vehicles.

12. The apparatus, as claimed in claim 11, wherein the means for receiving fuel information comprises:

an RF interrogator operable to interrogate a wireless fluid flow meter and read a value corresponding to fluid that has flowed through the meter; and an RF receiver that receives information from the RF interrogator.

13. The apparatus, as claimed in claim 11, further comprising:

means for tracking the fuel economy of the plurality of vehicles for a plurality of fueling events for each vehicle;

means for computing an average fuel economy for each of the plurality of vehicles; and means for identifying deviations from the average fuel economy.

14. The apparatus, as claimed in claim 13, further comprising:

means for determining a probable source of the fuel economy deviation.

15. The apparatus, as claimed in claim 14, further comprising:

means for generating an exception report indicating deviations and identifying a vehicle of the plurality of vehicles as having a deviation; and means for transmitting the exception report to a user.

* * * * *